(12) United States Patent
Bärecke et al.

(10) Patent No.: US 11,292,310 B2
(45) Date of Patent: Apr. 5, 2022

(54) CONTROL DEVICE AND METHOD FOR ADJUSTING THE DAMPER HARDNESS OF A VIBRATION DAMPER OF A TRANSPORTATION VEHICLE

(71) Applicant: VOLKSWAGEN AKTIENGESELLSCHAFT, Wolfsburg (DE)

(72) Inventors: Frank Bärecke, Wolfsburg (DE); Stefan Kukla, Wathlingen (DE)

(73) Assignee: Volkswagen Aktiengesellschaft

( * ) Notice: Subject to any disclaimer, the term of this patent is extended or adjusted under 35 U.S.C. 154(b) by 629 days.

(21) Appl. No.: 16/094,590

(22) PCT Filed: Apr. 6, 2017

(86) PCT No.: PCT/EP2017/058284
§ 371 (c)(1),
(2) Date: Oct. 18, 2018

(87) PCT Pub. No.: WO2017/182288
PCT Pub. Date: Oct. 26, 2017

(65) Prior Publication Data
US 2020/0324609 A1    Oct. 15, 2020

(30) Foreign Application Priority Data

Apr. 19, 2016    (DE) ..................... 10 2016 206 604.8

(51) Int. Cl.
*B60G 17/08*    (2006.01)
*B60G 15/06*    (2006.01)
(Continued)

(52) U.S. Cl.
CPC ............. *B60G 17/08* (2013.01); *B60G 15/06* (2013.01); *B60G 17/018* (2013.01);
(Continued)

(58) Field of Classification Search
CPC ................. B60G 15/06; B60G 17/018; B60G 17/01908; B60G 17/06; B60G 17/08;
(Continued)

(56) References Cited

U.S. PATENT DOCUMENTS

| 4,916,536 A | * | 4/1990 | Kerr ...................... G01S 7/4811 |
| | | | 348/139 |
| 5,090,728 A | * | 2/1992 | Yokoya ................ B60G 17/015 |
| | | | 280/5.519 |

(Continued)

FOREIGN PATENT DOCUMENTS

| DE | 4116839 A1 | 1/1992 |
| DE | 4323552 A1 | 1/1994 |

(Continued)

OTHER PUBLICATIONS

Search Report for German Patent Application No. 10 2016 206 604.8; dated Dec. 19, 2016.

(Continued)

*Primary Examiner* — Hunter B Lonsberry
*Assistant Examiner* — Daniel L Greene
(74) *Attorney, Agent, or Firm* — Barnes & Thornburg LLP

(57) ABSTRACT

A method for adjusting the damper hardness of a vibration damper of a wheel of a transportation vehicle, wherein the transportation vehicle body movement signal is generated by a control device of the transportation vehicle from a first sensor signal of the first sensor unit connected fixedly in to a transportation vehicle body, a wheel movement signal is generated from a second sensor signal of a second sensor unit which detects a wheel position of the wheel with respect to the body, a speed signal which describes a speed of the transportation vehicle body is generated based on the transportation vehicle body movement signal, and the wheel (Continued)

movement signal and an actuation signal for setting the damper hardness is generated based on the speed signal. The transportation vehicle body movement signal is filtered by a first filter unit and/or the wheel movement signal is filtered by a second filter unit.

24 Claims, 4 Drawing Sheets

(51) Int. Cl.
*B60G 17/018* (2006.01)
*B60G 17/019* (2006.01)

(52) U.S. Cl.
CPC .... *B60G 17/01908* (2013.01); *B60G 2204/62* (2013.01); *B60G 2400/102* (2013.01); *B60G 2400/202* (2013.01); *B60G 2400/206* (2013.01); *B60G 2400/252* (2013.01); *B60G 2500/10* (2013.01); *B60G 2600/602* (2013.01); *B60G 2600/604* (2013.01)

(58) Field of Classification Search
CPC .......... B60G 2204/62; B60G 2400/102; B60G 2400/202; B60G 2400/206; B60G 2400/252; B60G 2400/91; B60G 2500/10; B60G 2600/602; B60G 2600/604
See application file for complete search history.

(56) References Cited

U.S. PATENT DOCUMENTS

| | | | | |
|---|---|---|---|---|
| 5,189,615 | A | * | 2/1993 | Rubel .................... B60G 17/08 701/37 |
| 5,444,621 | A | * | 8/1995 | Matsunaga ........ B60G 17/0165 280/5.518 |
| 5,483,448 | A | | 1/1996 | Liubakka et al. |
| 2009/0132137 | A1 | * | 5/2009 | Takenaka ............ B60W 40/101 701/70 |
| 2014/0195112 | A1 | * | 7/2014 | Lu ...................... B60G 17/0165 701/37 |

FOREIGN PATENT DOCUMENTS

| | | |
|---|---|---|
| DE | 4302884 A1 | 8/1994 |
| DE | 102008046876 A1 | 3/2010 |
| DE | 112008003044 T5 | 10/2010 |
| DE | 102012016573 A1 | 3/2013 |
| DE | 102013219588 A1 | 4/2014 |
| DE | 102015205369 A1 | 10/2015 |
| DE | 102014208323 A1 | 11/2015 |
| EP | 2052885 A2 | 4/2009 |
| EP | 2209658 A1 | 7/2010 |
| EP | 3006238 A1 | 4/2016 |

OTHER PUBLICATIONS

Search Report for International Patent Application No. PCT/EP2017/058284; dated Jun. 28, 2017.

* cited by examiner

CONTROL DEVICE AND METHOD FOR ADJUSTING THE DAMPER HARDNESS OF A VIBRATION DAMPER OF A TRANSPORTATION VEHICLE

PRIORITY CLAIM

This patent application is a U.S. National Phase of International Patent Application No. PCT/EP2017/058284, filed 6 Apr. 2017, which claims priority to German Patent Application No. 10 2016 206 604.8, filed 19 Apr. 2016, the disclosures of which are incorporated herein by reference in their entireties.

SUMMARY

Illustrative embodiments relate to a method and a control device for adjusting the damper hardness of a vibration damper of a wheel of a transportation vehicle. The damper hardness is adjusted as a function of two sensor signals, of which one is received from a sensor unit on a body of the transportation vehicle and the second from a sensor unit that detects a wheel movement of the wheel.

BRIEF DESCRIPTION OF THE DRAWINGS

An exemplary embodiment is described below. In the figures.

DETAILED DESCRIPTION

Figure 1:
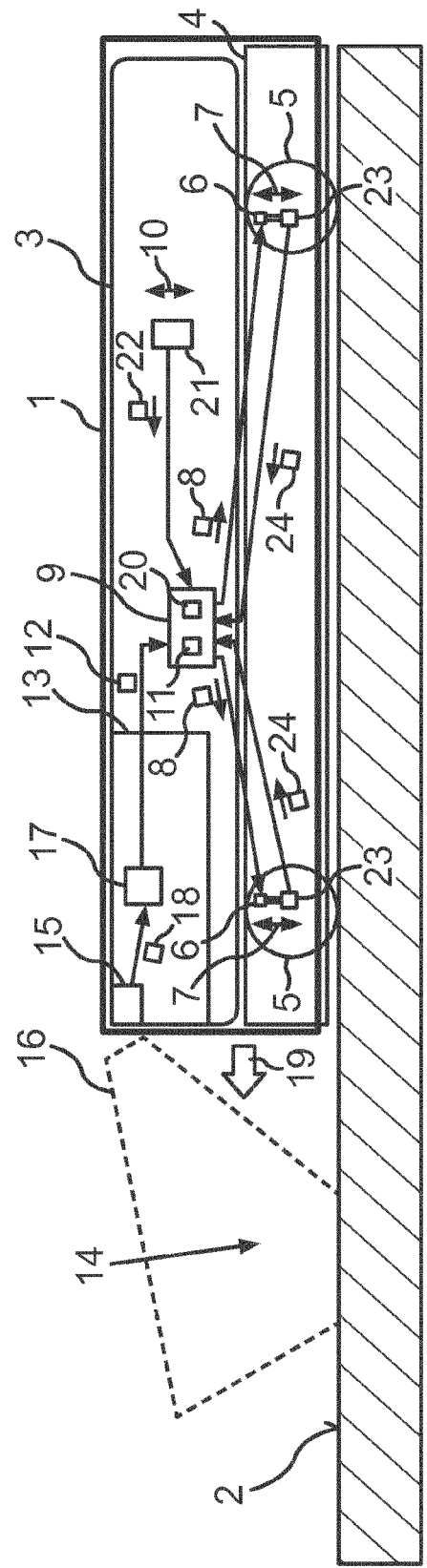
FIG. 1 shows a schematic representation of an embodiment of the disclosed transportation vehicle.

A method of this type and a control device of this type are known from DE 10 2013 219 588 A1, for example. According thereto, an acceleration sensor is disposed on each of a chassis of a transportation vehicle and a wheel of the transportation vehicle, from the sensor signals of which a respective speed is calculated. An actuation signal for adjusting the damper hardness is produced from the speeds. With this method, it is necessary to use the sensor signals of both sensors for all vibration frequencies of a body movement of the transportation vehicle to calculate therefrom a relative speed between the chassis and the wheel. However, the sensors are suitable to a different extent for different vibration frequencies.

From DE 10 2014 208 323 A1, adjustment of a damper hardness of a vibration damper of a transportation vehicle is known that can receive a speed demand for a body of the transportation vehicle as a setpoint value signal, for example. An actual value signal can be determined based on a wheel acceleration, a ride height of the wheels, i.e., a compression travel of the vibration damper, a body acceleration of the body and other sensor signals. Predictive adjustment of the chassis damping can be carried out to parts of the road surface that will come into contact with individual wheels, for which a road surface quality can be detected by a camera, for example. Also, with this method no distinction is made between the different suitabilities of the sensor signals when adjusting the damper hardness.

From DE 10 2015 205 369 A1, adjustment of the damper hardness of a vibration damper is known that takes into account a height profile of a road ahead of the transportation vehicle. For this purpose, a section of the road ahead is filmed, for example, and the height profile is then determined therefrom. This enables information to be supplemented that does not yet directly relate to a vibration damper but will only do so in the future.

For detecting a current speed of movement of a body of the transportation vehicle, two different sensor units can thus be used in the way described, one on the body itself to detect the acceleration thereof and one on a wheel to detect a wheel movement that can be carried out by the wheel independently of the body by enabling a relative movement by the vibration damper of the wheel. A different term for vibration damper is also damper strut or spring strut or chassis damper.

The use of both sensor units can result in problems. If a transportation vehicle is driving over a pothole, for example, then the wheel is briefly jerkily deflected relative to the body of the transportation vehicle downwards away from the body. As a rule, the body itself does not carry out a significant movement in response to the pothole during this. Thus, the relative movement of the wheel must be ignored when adjusting the damper hardness, because it does not necessitate adjustment of the movement of the body. Accordingly, the sensor signal of a sensor unit that is disposed on the wheel or that is moving with the wheel must be processed appropriately.

Conversely, for example, when driving uphill there is no relative movement between the wheel and the body, so that the sensor unit on the wheel does not signal any relevant relative movement in relation to the body. On the other hand, the sensor unit that is fixed to the body signals a continuous, long-lasting upwards movement, which however is also to be ignored, because the transportation vehicle as a whole is moving upwards and a change of the damper hardness makes no sense for the movement. Accordingly, a sensor signal of a sensor unit that is fixed to the body must therefore also be processed adaptively in this case.

Disclosed embodiments provide a reliable estimate of the speed of movement of the body in the vertical direction for adjusting the damper hardness of a vibration damper of a transportation vehicle wheel.

A method for adjusting the damper hardness of a vibration damper of a wheel of a transportation vehicle is provided. The method can be carried out by a control device of the transportation vehicle. A body movement signal is produced from a first sensor signal of a first sensor unit. The first sensor unit is joined to a body of the transportation vehicle so as to move therewith, i.e., for example, is attached to a frame or chassis of the transportation vehicle. An acceleration signal of an acceleration sensor that detects the acceleration of the body in the vertical direction can be received as the first sensor signal, for example. The body movement signal can then be produced by mathematical integration of the sensor signal.

A wheel movement signal is produced from a second sensor signal of a second sensor unit. The second sensor unit detects a wheel position of the wheel relative to the body. A travel signal of a wheel travel sensor that detects the compression travel of the vibration damper can be received as the second sensor signal, for example. For example, the compression travel describes a relative position of a piston of the vibration damper relative to a cylinder of the vibration damper in which the piston is movably disposed.

Based on the body movement signal and the wheel movement signal, a speed signal is produced that describes the speed of the body. An actuation signal for adjusting the damper hardness is then produced as a function of the speed signal. Using the actuation signal, a control valve of the vibration damper can be actuated in a known way, for example.

Using the sensor signals of the sensor units described, the problems described above could, for example, result from driving through a pothole on the one hand and when driving uphill on the other hand. To avoid the problems, it is provided that the body movement signal is filtered by a first filter unit comprising a high-pass characteristic or a bandpass characteristic. In addition or alternatively, it is provided that the wheel movement signal is filtered by a second filter unit comprising a low-pass characteristic. In other words, the result of this is that the speed signal, which as a whole describes the body movement, is formed or produced in a predetermined high-frequency range entirely or predominantly from the body movement signal and/or in a predetermined low-frequency range entirely or predominantly from the wheel movement signal. In the high-frequency range, a percentage change of the body movement signal thus produces a larger variation in the resulting speed signal than an equal percentage change of the wheel movement signal. Conversely, a percentage change of the wheel movement signal in the low-frequency range produces a larger relative change in the speed signal than an equal percentage change in the body movement signal. The filtered body movement signal and the filtered wheel movement signal can then be combined into the speed signal, which indicates the speed of the body.

Disclosed embodiments provide for the wheel movement, as detected as wheel travel by the second sensor unit, for example, being ideally used for the detection of a low-frequency or slow body movement, whereas at the same time the problem is solved that the linkage of the body movement to the road is ignored or suppressed by the use of a wheel travel sensor during wheel movement in the high-frequency range. Thus, the sensor unit is only used for movement frequencies for which it provides a meaningful sensor signal. At the same time, the sensor signal of the first sensor unit can be suitably scaled in the respective frequency range to obtain a meaningful body movement speed signal for all frequencies.

It is provided that a frequency limit of the second filter unit, i.e., the low-pass filter, is lower than a lower frequency limit of the first filter unit, i.e., the high-pass filter or bandpass filter. The frequency limit can, for example, be defined in a known way as the −3 dB limit (minus 3 dB). An alternative term for the frequency limit is the corner frequency or cut-off frequency. Owing to the development, the influences of the body movement signal and the wheel movement signal on the resulting body speed signal are non-overlapping or at least the influence of one of the two signals always predominates.

The frequency limit of the second filter unit, i.e., the low-pass filter, may lie in a range from 0.5 Hz to 5 Hz in this case. Below the frequency limit, i.e., in a range from 0 Hz up to the frequency limit, the sensor signal of a wheel travel sensor has proved to be reliable for distinguishing between uphill travel on the one hand and an actual rolling motion or pitching motion of the transportation vehicle on the other hand, for example.

There is a transition region in the region between the frequency limits of the two filter units. With this it is provided that there is merging between the respective profiles of the first filter unit and the second filter unit. I.e., there is thus a gradual merging of the influence from the second sensor unit, i.e., for example, the wheel travel sensor, to the first sensor unit, i.e., for example, a body-acceleration sensor, with increasing movement frequency f.

By adjusting the damper hardness, in particular, a vertical speed of the body is adjusted. In other words, the vertical speed of the body is adjusted to a current value of a setpoint value signal by the actuation signal. During this, the speed signal of the body is used as an actual value signal for control. In the way described, it can be reliably used as a description of the actual speed of the body, because neither uphill travel nor driving though a pothole causes false values for the current speed of the body.

The setpoint value signal may be determined using a height profile of a driving surface lying ahead of the transportation vehicle. The height profile can be produced in the manner described above by a detection unit, which can, for example, film the driving surface ahead and determine the height profile from image data based on image analysis, for example.

The actuation signal can then be determined from a difference between the actual value signal and the setpoint value signal. The difference can, for example, be a difference that can be converted into the actuation signal by a PID controller, for example. Alternatively, it can be provided that the actuation signal is produced based on a cost function. Using the cost function, a jolt in the body of the transportation vehicle is assessed regarding the extent to which the jolt affects a comfort value on the one hand and a driving safety value and/or a resulting compression travel of the vibration damper on the other hand. The jolt is the time derivative of the body acceleration. In other words, the deviation or the difference from the setpoint speed is assigned virtual costs. Cost functions are a standard instrument in control technology, so that for the person skilled in the art, the design or configuration of such cost functions is possible with methods or mechanisms from the prior art. The cost function enables the comfort or conversely the discomfort of the current damper intervention to be weighed in the controller against the discomfort due to a false body speed, if, for example, the vibration damper reaches the stop. By the cost function, a common optimum can thus be found that weighs the comfort during the body movement on the one hand and the driving safety and/or the compression of the vibration damper on the other hand against each other. For example, this can be necessary if a very severe compression on uneven ground can cause damage at the ground interface, i.e., for example, the vibration damper reaches the stop in the way described.

The described cost function may be speed-dependent, so that, for example, the comfort value is given greater influence at a first driving speed than at a higher second driving speed, at which the driving safety value and/or the value of the compression travel has more associated influence than at the first driving speed.

Disclosed embodiments provide a control device for one or more vibration dampers of a respective wheel of a transportation vehicle, by which the respective damper hardness of each vibration damper is adjusted. The control device is arranged to receive a first sensor signal of a first sensor unit that is joined to a body of the transportation vehicle so as to move with the body and a second sensor signal per wheel of a second sensor unit detecting a wheel position relative to the body. In addition, the control device is arranged to output an actuation signal per wheel for adjusting the damper hardness to the respective vibration damper of the wheel. The control device can, for example, comprise a processor device for this purpose that can comprise a microcontroller and/or a microprocessor, for example. The disclosed control device is arranged to carry out a disclosed embodiment of the method for each wheel.

Finally, also disclosed is a transportation vehicle that comprises wheels with a vibration damper in a known way, the damper hardness of which is adjustable. Furthermore, the transportation vehicle comprises the described first sensor unit, which is joined to the body of the transportation vehicle so as to move with the body, and a second sensor unit per wheel that detects a wheel position of the wheel relative to the body. Finally, the disclosed transportation vehicle comprises an embodiment of the disclosed control device.

The disclosed transportation vehicle may be designed as a transportation vehicle, in particular, as a passenger transportation vehicle or a truck. The transportation vehicle can however also be designed as an industrial truck, for example.

With the exemplary embodiment, the described components of the embodiment each represent individual, independently considered features, which also develop independently of each other and thus can also be considered as a component of the disclosure individually or in different combinations than that shown. Furthermore, the described embodiment can also be supplemented by more of the already described features.

In the figures, functionally equivalent elements are each provided with the same reference characters.

FIG. 1 shows a transportation vehicle 1 that in the illustrated example can drive directly over a driving surface 2, for example, a road. The transportation vehicle 1 can comprise a frame or a body 3 that can be spring-mounted on a chassis 4 of the transportation vehicle 1 in a known way. The spring mounting can be achieved in a known way by joining the wheels 5 of the transportation vehicle 1 to the body 3 by the vibration dampers 6 thereof. The vibration damper 6 enables a relative movement 7 between the wheels 5 on the one hand and the body 3 on the other hand.

The vibration dampers 6 can be actively configured with the transportation vehicle 1, i.e., a damper hardness or damping force of the vibration damper 6 can be adjusted by an actuation signal 8. The actuation signal 8 can be produced by a control device 9, which, for example, can be configured as a control unit of the transportation vehicle 1. The control device 9 can adjust the damper hardness in such a way that a vertical movement 10 of the body 3 is adjusted to a setpoint value signal 11.

The setpoint value signal 11 can be produced based on a height profile 12 that can be detected by a detecting device 13. The height profile 12 can describe a section of road 14 in the driving surface 2 ahead that the transportation vehicle 1 will drive or roll over in the future. For this purpose, a camera 15 can film the section of road 14 ahead with the detection region 16 thereof, for example. An analyzer 17 of the detecting device 13 can produce the height profile 12 from image data 18 of the camera 15 in a known way. For this purpose, the analyzer 17 can comprise a processor device that carries out an image analysis program. One possibility for determining the setpoint value signal for the vertical speed 10 is a distance or a section of road 14 with a length corresponding to half the natural frequency of the body, wherein a setpoint value for a vertical speed of the vertical movement 10 can be determined as the quotient of the change in height and the time. The distance thus results as a function of the natural frequency of the body and a driving speed 19 of the transportation vehicle 1.

For determining an actual value signal 20 for the vertical movement 10, the control device 9 can receive a sensor signal 22 from a first sensor unit 21. The sensor unit 21 can be an acceleration sensor that is attached to the body 3. Accordingly, the sensor signal 22 represents an acceleration signal.

Furthermore, a second sensor unit 23 that produces a respective second sensor signal 24 can be provided on each of the wheels 5. Each sensor unit 23 can be a wheel travel sensor, for example, wherein the sensor signal 24 then describes a compression travel of the vibration damper 6.

Figure 2:
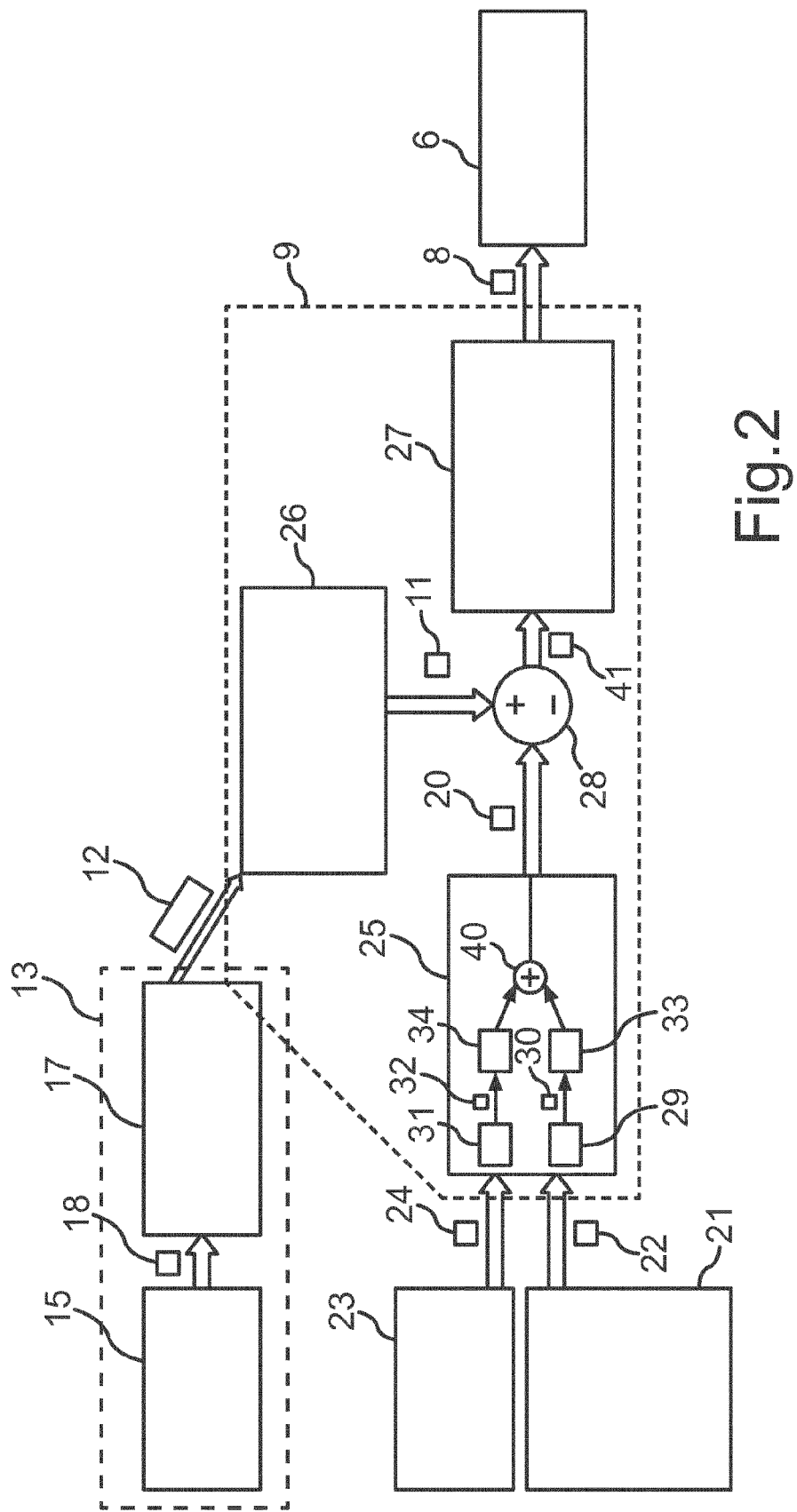
FIG. 2 shows a schematic representation of an embodiment of the disclosed control device.

FIG. 2 illustrates how the control device 9 produces the respective actuation signal 8 for setting a damper hardness in the vibration damper 6 from the height profile 12 and the sensor signals 22, 24 for a single wheel 5.

The control device 9 can comprise an estimator 25, a setpoint value determination method or mechanism 26, a control amplifier 27 and a decision determination method or mechanism 28. The elements 25-28 can each, for example, be a software module or a program module of the control device 9. The estimator 25 can, for example, produce a body movement signal 30 from the sensor signal 22 that describes the body acceleration by mathematical or numerical integration 29. A wheel movement signal 32 can be produced from the sensor signal 24, i.e., for example, the compression travel, by a mathematical or numerical differentiation 31, for example.

The control device 9 can comprise a first filter unit 33 for the body movement signal 30 and a second filter unit 34 for the wheel movement signal 32.

Figure 3:
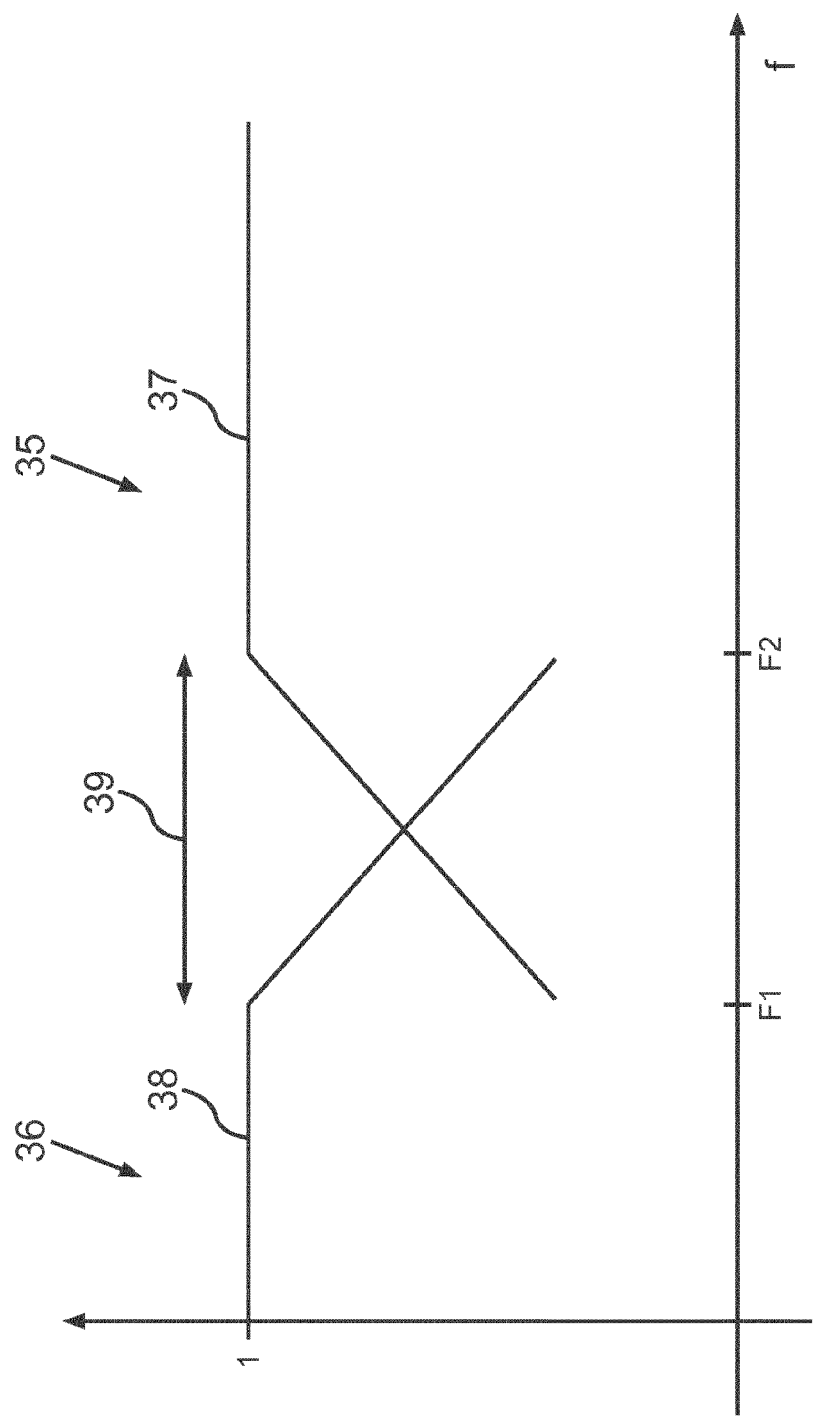
FIG. 3 shows a diagram with schematic profiles of characteristics of two filter units.

FIG. 3 illustrates respective filter characteristics 35, 36 against a frequency f. Respective profiles 37, 38 are represented. The profiles 37, 38 in FIG. 3 are shown normalized in respect of a unit amplification that is specified here with the value 1. The filter characteristic 35 of the filter unit 33 can comprise a high-pass characteristic with a lower frequency limit F2. The filter characteristic 36 of the filter unit 34 can comprise a low-pass characteristic with a frequency limit F1. The frequency limit F1 is lower than the frequency limit F2. Thus, a transition region 39 results, across which the profiles 37, 38 can merge. The frequency limit F1 can comprise a frequency value f in a range of 0.5 Hz to 5 Hz, for example.

The filtered movement signals 30, 32 can be combined in a superimposition 40, from which the actual value signal 20 results as a body movement signal. The superimposition 40 can, for example, be an addition of the filtered movement signals 30, 32.

A difference between the setpoint value signal 11 and the actual value signal 20 that is determined by the decision determination method or mechanism 28 represents a control error 41 and can be recalculated or converted into the actuation signal 8 by the control amplifier 27, for example, by a PID controller.

Figure 4:
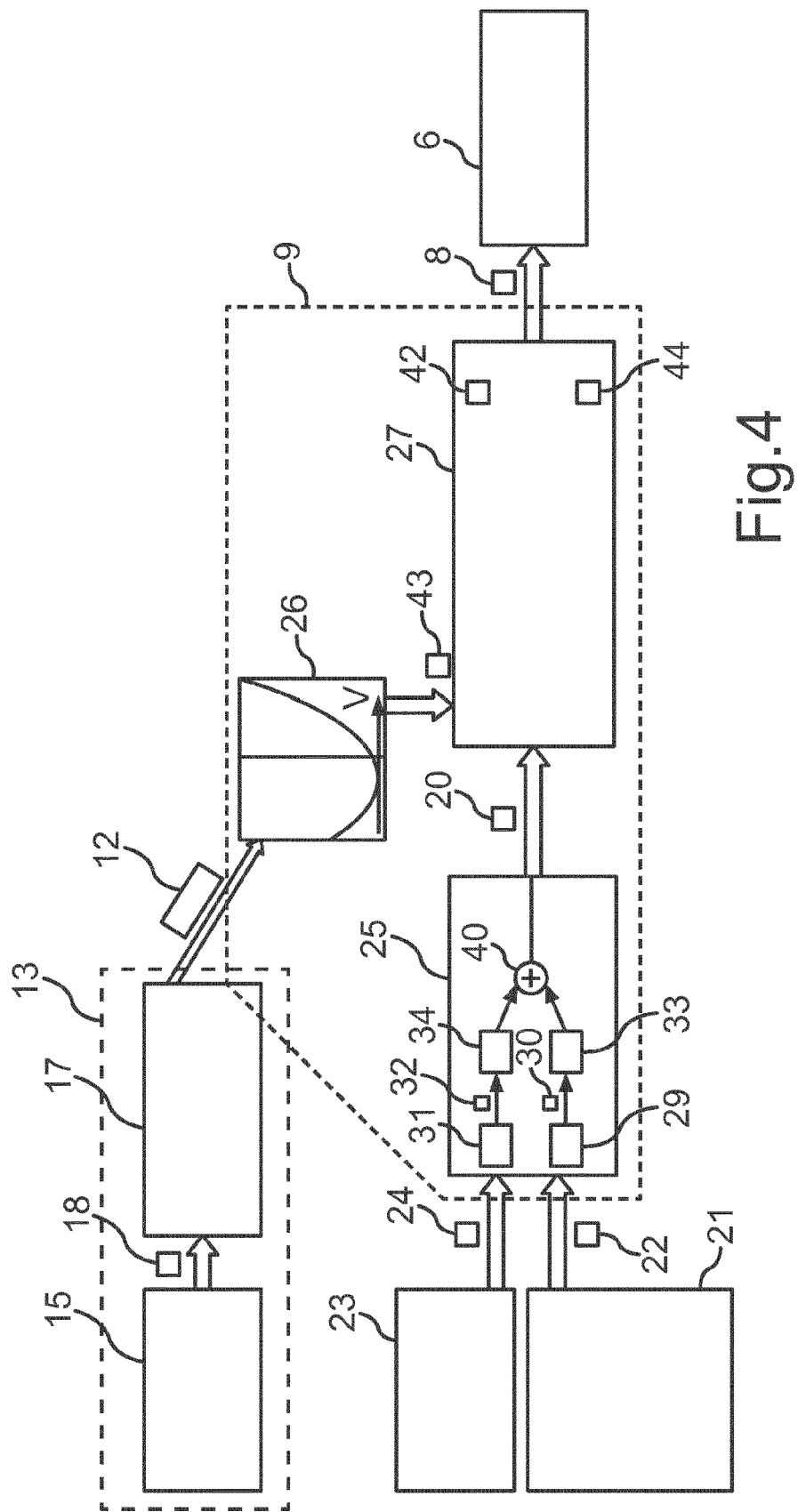
FIG. 4 shows a schematic representation of an alternative embodiment of the disclosed control device.

FIG. 4 illustrates an alternative embodiment, wherein a current value V of the driving speed 19 is taken into account by the setpoint value determination method or mechanism 26 when determining the setpoint value signal. The generation of the actuation signal 8 can then be carried out based on a cost function 42, wherein a discomfort to be expected or to be added can be specified as a function of the height profile 12 and the driving speed 19 by the setpoint value determination method or mechanism 26, for example, by a comfort value 43 that is to be added based on the driving speed 19 for a given height profile 12. The comfort value 43 can be opposed by a compression travel 44 to be expected for different values of the damper hardness. By a cost function 42, the comfort value 43 and the compression travel 44 can be assessed or weighted and an optimal actuation signal 8 can be produced therefrom according to the cost function 42. The driving speed 19 can also be taken into account during this. The comfort value 43 can, for example, indicate an acceleration and/or the derivative of an acceleration, i.e., the jolt, that is to be added or to be expected.

Overall, the control device 9 seeks to minimize the movement and acceleration of the body 3 by the damper adjustment.

In principle, it is however not the movement itself that is responsible for the discomfort, but the change in the movement, i.e., the acceleration and in turn the derivative thereof, the jolt. The body movement is triggered when rolling over the road behind, but also causes discomfort when rolling over the road ahead. The discomfort, i.e., the acceleration and/or the jolt, is then large if the movement of the body does not match the height profile of the road. For example, on the one hand a suddenly rising road forces the horizontally moving transportation vehicle into a change of movement.

The problem for a controller without perspective or preview is that there is no information regarding the height profile 12 that will be rolled over in the future. Thus, the speed that the body should have in the future is unknown.

The calculation of a current vertical speed of the body for the damper adjustment from the sensors, for example, from the body acceleration signal and the wheel travel signal, is carried out by the control device 9. In this case, the body speed of the vertical movement 10 in the high-frequency region (in particular, f>F2) is the integral of the body acceleration. In the low-frequency region (in particular, f<F1), the speed of the body results from the wheel speed. Compared to an approach that is only based on the body acceleration sensors, this approach offers the benefit that no abstract movement of the transportation vehicle in space is assessed, but the movement of the transportation vehicle relative to the road.

Determining a setpoint speed for the body can be carried out based on the height profile 12 of the road lying ahead of the transportation vehicle according to the preview information. A very simple option for determining the setpoint speed is to observe a distance approximately corresponding to half the natural frequency of the body and to determine the setpoint speed as the quotient of the change in height and the time.

The control error 41 for the speed of the body results from the comparison of setpoint and actual values if a linear controller is used.

A useful supplement is to assign (virtual) costs to the deviation of the setpoint speed. This enables the discomfort that would be caused by the current damping intervention to be weighed in the controller against the discomfort owing to a false speed of the body with no intervention and hence enables an optimum to be found. This is necessary if, for example, a very strong compression on an uneven surface can result in damage at the ground interface.

Thus, determining the actual body speed as a speed relative to the road is carried out by the control device by wheel travel sensors. The calculation of a setpoint speed for the vertical body movement 10 is also implemented. Determining a control error 41 for the vertical speed of the body can be carried out as the difference of the setpoint and actual speeds.

Overall, the example shows how a calculation of the vertical speed of a transportation vehicle can be carried out with a predictive function.

REFERENCE CHARACTER LIST

| | |
|---|---|
| 1 | transportation vehicle |
| 2 | driving surface |
| 3 | body |
| 4 | chassis |
| 5 | wheel |
| 6 | vibration damper |
| 7 | relative movement |
| 8 | actuation signal |
| 9 | control device |
| 10 | body movement |
| 11 | setpoint value signal |
| 12 | height profile |
| 13 | detecting device |
| 14 | section of road |
| 15 | camera |
| 16 | detection region |
| 17 | analyzer |
| 18 | image data |
| 19 | driving speed |
| 20 | actual value signal |
| 21 | sensor unit |
| 22 | sensor signal |
| 23 | sensor unit |
| 24 | sensor signal |
| 25 | elements |
| 25 | estimator |
| 26 | setpoint value determination |
| 27 | control amplifier |
| 28 | decision determination |
| 29 | integration |
| 30 | body movement signal |
| 31 | differentiation |
| 32 | wheel movement signal |
| 33 | filter unit |
| 34 | filter unit |
| 35 | filter characteristic |
| 36 | filter characteristic |
| 37 | profiles |
| 39 | transition region |
| 40 | overlap |
| 41 | control error |
| 42 | cost function |
| 43 | comfort value |
| 44 | compression travel |

The invention claimed is:

1. A method for adjusting damper hardness of a vibration damper of a wheel of a transportation vehicle, wherein a control device of the transportation vehicle:
produces a body movement signal based on a first sensor signal from a first sensor unit joined to a body of the transportation vehicle to move with the body;
produces a wheel movement signal based on a second sensor signal from a second sensor unit that detects a wheel position of the wheel relative to the body;
produces a speed signal describing a speed of the body based on the body movement signal and the wheel movement signal; and
produces an actuation signal for adjusting the damper hardness using the speed signal,
wherein the body movement signal is filtered by a first filter unit with a high-pass characteristic or bandpass characteristic and/or the wheel movement signal is filtered by a second filter unit with a low-pass characteristic, and
wherein a vertical speed of the body is adjusted to a current value of a setpoint value signal by the actuation signal and the speed signal is used as an actual value signal for control, the setpoint value signal determined using a height profile of a driving surface lying ahead of the transportation vehicle and the height profile detected by a detection unit, wherein the actuation signal is determined based on a difference between the actual value signal and the setpoint value signal based on a cost function, assessment in the cost function being speed-dependent, wherein a jolt in the body of the transportation vehicle resulting from a change in the vertical speed is assessed by the cost function in relation to a comfort value and a driving safety value and/or a resulting compression travel of the vibration damper.

2. The method of claim 1, wherein the first sensor signal is an acceleration signal of an acceleration sensor that detects an acceleration of the body in the vertical direction.

3. The method of claim 1, wherein the second sensor signal is a travel signal of a wheel travel sensor that detects a compression travel of the vibration damper.

4. The method of claim 1, wherein the assessment in the cost function being speed-dependent imposes greater influence to the comfort value at a first speed than at a second speed that is higher than the first speed.

5. The method of claim 4, wherein the assessment in the cost function being speed-dependent imposes greater influence to the driving safety value and/or a resulting compression travel of the vibration damper at the second speed than at the first speed.

6. The method of claim 1, wherein a frequency limit of the second filter unit is lower than a lower frequency limit of the first filter unit.

7. The method of claim 6, wherein the frequency limit of the second filter unit lies in a range from 0.5 Hz to 5 Hz.

8. The method of claim 6, wherein a transition region is formed between the frequency limits of the two filter units, wherein merging occurs between the respective profiles of the first filter unit and the second filter unit.

9. A control device for at least one vibration damper having an adjustable damper hardness for a corresponding wheel of a plurality of wheels of a transportation vehicle, wherein the control device receives a first sensor signal from a first sensor unit that is joined to a body of the transportation vehicle and a second sensor signal from a second sensor unit provided for each wheel of the plurality of transportation vehicle wheels, wherein the second sensor units detect wheel position relative to the transportation vehicle body, and wherein the second sensor units output an actuation signal for each wheel for adjusting the damper hardness in the at least one vibration damper,
wherein the control device:
adjusts damper hardness of the at least one vibration damper by producing a body movement signal based on the first sensor signal from the first sensor unit joined to the body of the transportation vehicle to move with the body;
produces a wheel movement signal based on the second sensor signal of the second sensor unit that detects wheel position of the respective wheel relative to the body;
produces a speed signal describing a speed of the body based on the body movement signal and the wheel movement signal; and
produces an actuation signal for adjusting the damper hardness using the speed signal,
wherein the body movement signal is filtered by a first filter unit with a high-pass characteristic or bandpass characteristic and/or the wheel movement signal is filtered by a second filter unit with a low-pass characteristic, and wherein a vertical speed of the body is adjusted to a current value of a setpoint value signal by the actuation signal and the speed signal is used as an actual value signal for control, the setpoint value signal determined using a height profile of a driving surface lying ahead of the transportation vehicle and the height profile detected by a detection unit, wherein the actuation signal is determined based on a difference between the actual value signal and the setpoint value signal based on a cost function, assessment in the cost function being speed-dependent, wherein a jolt in the body of the transportation vehicle resulting from a change in the vertical speed is assessed by the cost function in relation to a comfort value and a driving safety value and/or a resulting compression travel of the vibration damper.

10. The control device of claim 9, wherein the first sensor signal is an acceleration signal of an acceleration sensor that detects an acceleration of the body in the vertical direction.

11. The control device of claim 9, wherein the second sensor signal is a travel signal of a wheel travel sensor that detects a compression travel of the vibration damper.

12. The control device of claim 9, wherein the assessment in the cost function being speed-dependent imposes greater influence to the comfort value at a first speed than at a second speed that is higher than the first speed.

13. The control device of claim 12, wherein the assessment in the cost function being speed-dependent imposes greater influence to the driving safety value and/or a resulting compression travel of the vibration damper at the second speed than at the first speed.

14. The control device of claim 9, wherein a frequency limit of the second filter unit is lower than a lower frequency limit of the first filter unit.

15. The control device of claim 14, wherein the frequency limit of the second filter unit lies in a range from 0.5 Hz to 5 Hz.

16. The control device of claim 14, wherein a transition region is formed between the frequency limits of the two filter units, wherein merging occurs between the respective profiles of the first filter unit and the second filter unit.

17. A transportation vehicle with wheels, each comprising a vibration damper having an adjustable damper hardness, and with a first sensor unit joined to a body of the transportation vehicle to move with said body, and with a respective second sensor unit per wheel that detects a wheel position of the wheel relative to the body,
wherein the control device:
adjusts damper hardness of the at least one vibration damper by producing a body movement signal based on the first sensor signal from the first sensor unit joined to the body of the transportation vehicle to move with the body;
produces a wheel movement signal based on the second sensor signal of the second sensor unit that detects wheel position of the respective wheel relative to the body;
produces a speed signal describing a speed of the body based on the body movement signal and the wheel movement signal; and
produces an actuation signal for adjusting the damper hardness using the speed signal,
wherein the body movement signal is filtered by a first filter unit with a high-pass characteristic or bandpass characteristic and/or the wheel movement signal is filtered by a second filter unit with a low-pass characteristic, and wherein a vertical speed of the body is adjusted to a current value of a setpoint value signal by the actuation signal and the speed signal is used as an actual value signal for control, the setpoint value signal determined using a height profile of a driving surface lying ahead of the transportation vehicle and the height profile detected by a detection unit, wherein the actuation signal is determined based on a difference between the actual value signal and the setpoint value signal based on a cost function, assessment in the cost function being speed-dependent, wherein a jolt in the body of the transportation vehicle resulting from a change in the vertical speed is assessed by the cost function in relation to a comfort value and a driving safety value and/or a resulting compression travel of the vibration damper.

18. The transportation vehicle of claim 17, wherein the first sensor signal is an acceleration signal of an acceleration sensor that detects an acceleration of the body in the vertical direction.

19. The transportation vehicle of claim 17, wherein the second sensor signal is a travel signal of a wheel travel sensor that detects a compression travel of the vibration damper.

20. The transportation vehicle of claim 17, wherein a frequency limit of the second filter unit is lower than a lower frequency limit of the first filter unit.

21. The transportation vehicle of claim 20, wherein the frequency limit of the second filter unit lies in a range from 0.5 Hz to 5 Hz.

22. The transportation vehicle of claim 20, wherein a transition region is formed between the frequency limits of the two filter units, wherein merging occurs between the respective profiles of the first filter unit and the second filter unit.

23. The transportation vehicle of claim 17, wherein the assessment in the cost function being speed-dependent imposes greater influence to the comfort value at a first speed than at a second speed that is higher than the first speed.

24. The transportation vehicle of claim 23, wherein the assessment in the cost function being speed-dependent imposes greater influence to the driving safety value and/or a resulting compression travel of the vibration damper at the second speed than at the first speed.

\* \* \* \* \*